US008930518B2

(12) United States Patent
Dharmalingam et al.

(10) Patent No.: US 8,930,518 B2
(45) Date of Patent: Jan. 6, 2015

(54) PROCESSING OF WRITE REQUESTS IN APPLICATION SERVER CLUSTERS

(71) Applicant: Oracle International Corporation, Redwood Shores, CA (US)

(72) Inventors: Krishnamoorthy Dharmalingam, Tirupur (IN); Sankar Mani, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 240 days.

(21) Appl. No.: 13/633,884

(22) Filed: Oct. 3, 2012

(65) Prior Publication Data

US 2014/0095644 A1    Apr. 3, 2014

(51) Int. Cl.
  *G06F 15/173* (2006.01)
(52) U.S. Cl.
  USPC ............ 709/223; 709/219; 709/224; 711/141; 711/144
(58) Field of Classification Search
  USPC .............. 709/213, 203, 217, 219, 223, 224; 711/141, 144
  See application file for complete search history.

(56) References Cited

U.S. PATENT DOCUMENTS

| 5,544,345 | A | | 8/1996 | Carpenter et al. | |
|---|---|---|---|---|---|
| 5,802,561 | A | | 9/1998 | Fava et al. | |
| 6,006,299 | A | * | 12/1999 | Wang et al. | 710/108 |
| 6,430,654 | B1 | | 8/2002 | Mehrotra et al. | |
| 7,287,122 | B2 | | 10/2007 | Rajamony et al. | |
| 7,552,282 | B1 | | 6/2009 | Bermingham et al. | |
| 7,930,481 | B1 | | 4/2011 | Nagler et al. | |
| 8,010,991 | B2 | | 8/2011 | Sarukkai et al. | |
| 8,024,380 | B2 | | 9/2011 | Mishra | |
| 8,667,098 | B2 | * | 3/2014 | Naganuma et al. | 709/220 |
| 2002/0059324 | A1 | * | 5/2002 | Kitamura et al. | 707/201 |
| 2002/0062372 | A1 | * | 5/2002 | Hong et al. | 709/225 |
| 2003/0037154 | A1 | * | 2/2003 | Poggio et al. | 709/230 |
| 2006/0004957 | A1 | | 1/2006 | Hand, III et al. | |
| 2009/0083497 | A1 | * | 3/2009 | Yu et al. | 711/144 |
| 2009/0157973 | A1 | * | 6/2009 | Li et al. | 711/133 |

(Continued)

OTHER PUBLICATIONS

Cache for read and cache for write, http://aragozin.wordpress.com/2009/04/22/cache-for-read-and-cache-for-write/ , Downloaded circa Jun. 11, 2012, pp. 1-5.

(Continued)

*Primary Examiner* — Lashonda Jacobs
(74) *Attorney, Agent, or Firm* — Narendra Reddy Thappeta

(57) ABSTRACT

An application server of a server cluster may store a payload of a write request in a local cache and thereafter serve read requests based on payloads in the local cache if the corresponding data is present when such read requests are received. The payloads are however later propagated to respective data stores at a later suitable time. Each application server in the server cluster retrieves data from the data stores if the required payload is unavailable in the respective local cache. According to another aspect, an application server signals to other application servers of the server cluster if a required payload is unavailable in the local cache. In response, the application server having the specified payload (in local cache) propagates the payload with a higher priority to the corresponding data store, such that the payload is available to the requesting application server.

20 Claims, 6 Drawing Sheets

(56) References Cited

U.S. PATENT DOCUMENTS

| | | | |
|---|---|---|---|
| 2009/0182945 A1* | 7/2009 | Aviles et al. | 711/122 |
| 2010/0153415 A1* | 6/2010 | Muntz | 707/758 |
| 2011/0029498 A1* | 2/2011 | Ferguson et al. | 707/703 |
| 2011/0264823 A1* | 10/2011 | Baptist et al. | 709/236 |
| 2012/0102136 A1* | 4/2012 | Srebrny et al. | 709/213 |
| 2013/0042066 A1* | 2/2013 | Price | 711/119 |
| 2013/0159637 A1* | 6/2013 | Forgette et al. | 711/154 |
| 2014/0207898 A1* | 7/2014 | Baptist et al. | 709/213 |

OTHER PUBLICATIONS

Read Caching Implementation, http://www.badros.com/greg/doc/enhanced-linux-nfs-client/node6.html, Downloaded circa Jun. 11, 2012, pp. 1-7.

Write-through and Write-behind Caching with the Cache Writer, http://ehcache.org/documentation/apis/write-through-caching, Downloaded circa Jun. 11, 2012, pp. 1-8.

* cited by examiner

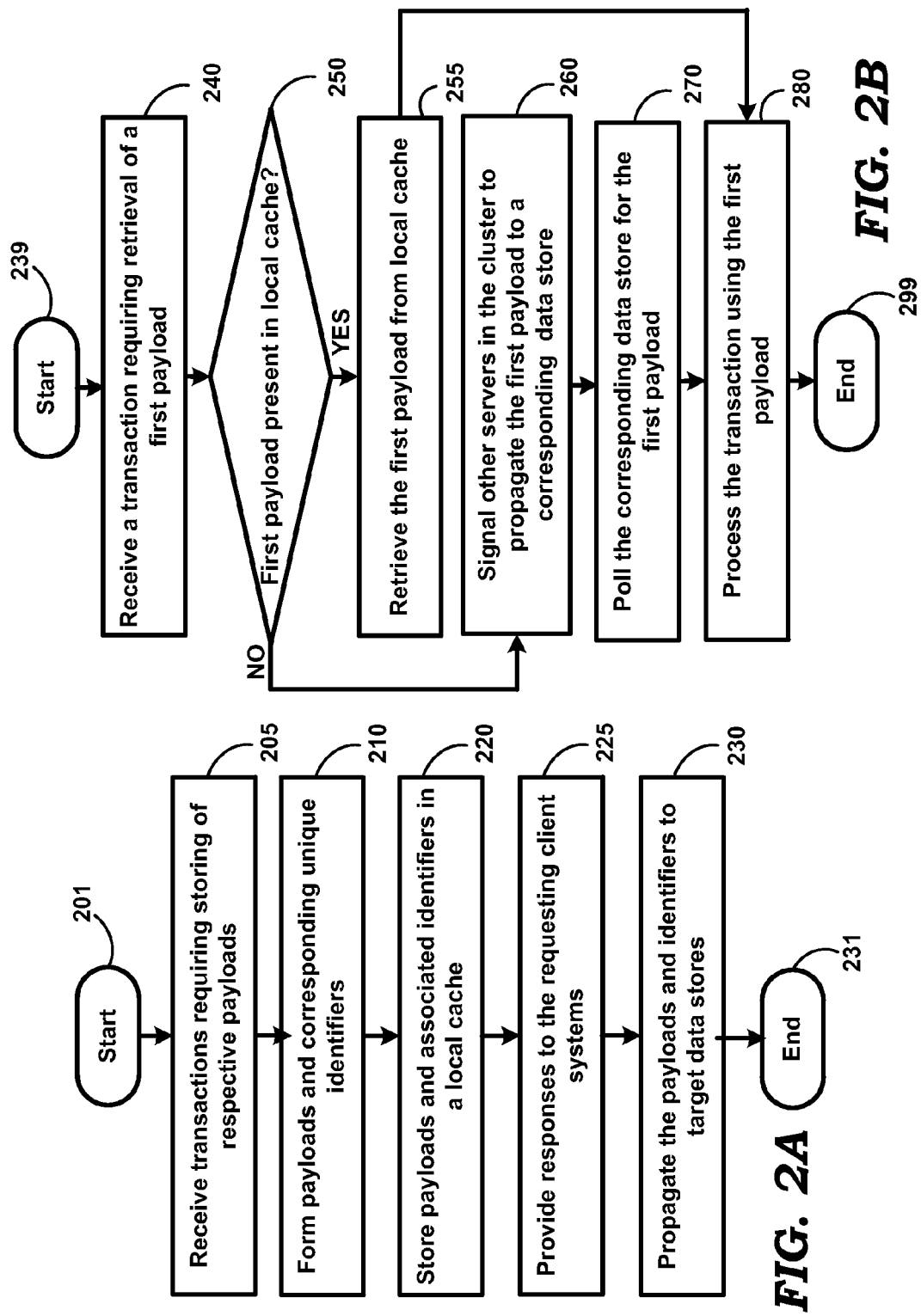

| Payload ID | Processed State | Creation Date/Time | Last Accessed | Stored By | Last Accessed By |
|---|---|---|---|---|---|
| S1M1 | True | 30-08-2012 02:01:00 | 30-08-2012 02:10:00 | AS1 | AS1 |
| S2M3 | True | 30-08-2012 02:05:00 | 30-08-2012 02:06:00 | AS2 | AS1 |
| S1M2 | False | 30-08-2012 02:05:00 | | AS1 | |

PROCESSING OF WRITE REQUESTS IN APPLICATION SERVER CLUSTERS

BACKGROUND OF INVENTION

1. Technical Field

The present disclosure relates to application server clusters, and more specifically to processing of write requests in such clusters.

2. Related Art

An application server refers to a digital processing system, which executes one or more user applications to process corresponding transactions. Each user application may be tailored to process transactions of corresponding type (bank transactions, order processing, etc.). The transactions for each application type are typically received from external client systems or other application servers.

Application servers are often deployed in the form of server clusters. A server cluster refers to a group of linked (application) servers, working together closely and deployed to improve performance and/or availability over that provided by a single server. Thus, in addition to executing the corresponding user applications, application servers may be deployed with appropriate software and/or hardware to be linked with other servers of the cluster.

Write requests are often generated while processing individual transactions. A write request entails storing of data for later use and a corresponding write operation is executed. The data is often stored in specialized servers such as database servers, which provide for persistent storage.

The write requests may need to be processed, while meeting various requirements such as desired performance throughput.

BRIEF DESCRIPTION OF THE DRAWINGS

Example embodiments of the present invention will be described with reference to the accompanying drawings briefly described below.

FIGS. 2A and 2B are respective flow charts illustrating the manner in which write and read requests are processed in an embodiment.

FIG. 3B depicts a table maintained together by the application servers of a cluster to process read and write requests in an embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

An application server of a server cluster provided according to an aspect of the present invention stores a payload of a write request in a local cache and thereafter serves read requests based on payloads in the local cache if the corresponding data is present when such read requests are received. The payloads are however later propagated to respective data stores at a later suitable time (e.g., when processing resources are under-utilized otherwise). Each application server in the server cluster however retrieves data from the data stores if the required payload is unavailable in the respective local cache.

According to another aspect, an application server signals to other application servers of the server cluster if a required payload is unavailable in the local cache. In response, the application server having the specified payload propagates the payload with a higher priority to the corresponding data store, such that the payload is available to the requesting application server. In an embodiment, such signaling is performed only after checking whether the required payload is already available in the corresponding data store also. In an alternative embodiment, the signaling is performed without such checking in the data store.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
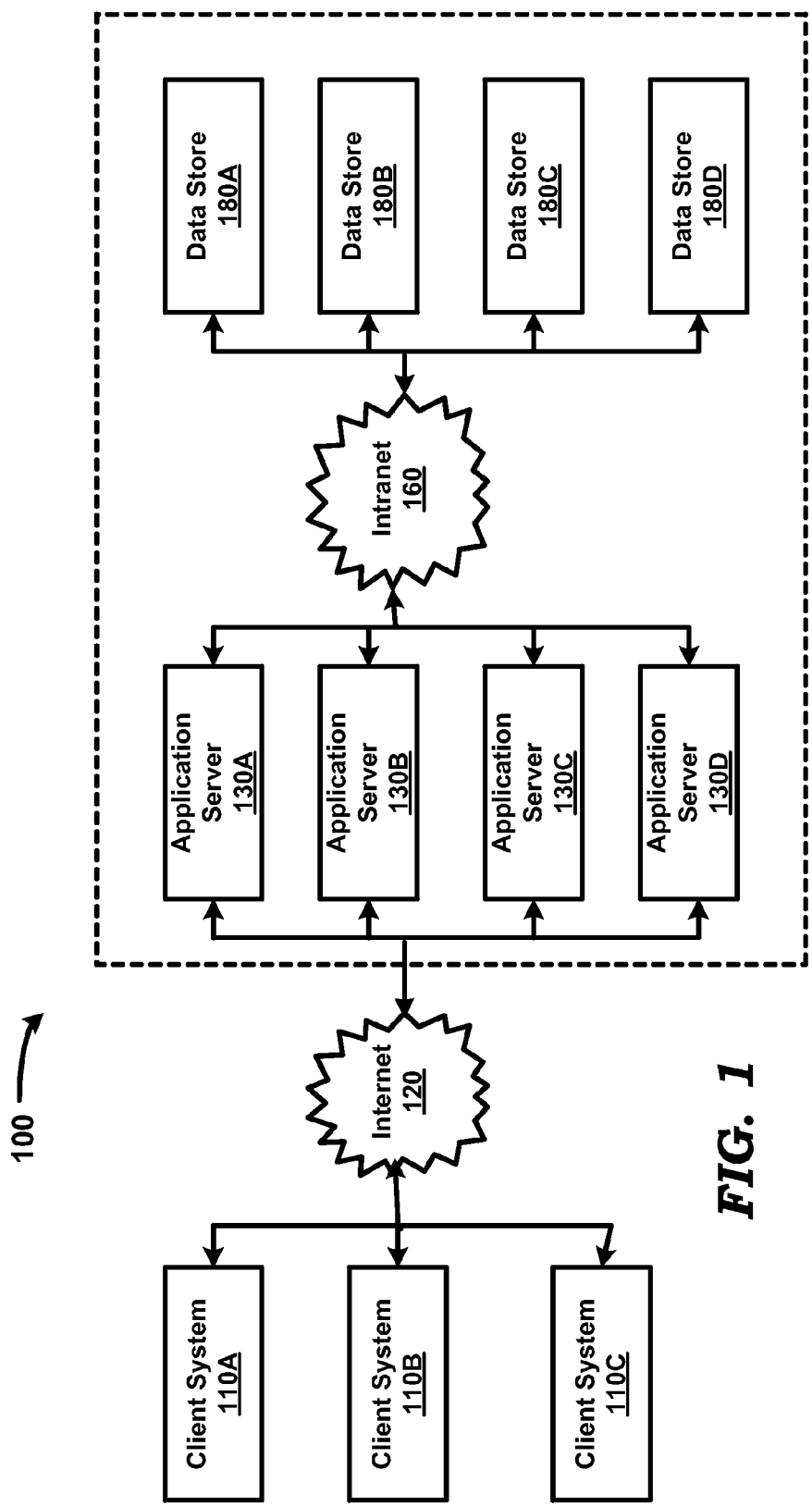
FIG. 1 is block diagram illustrating an example environment in which several aspects of the present invention can be implemented.

FIG. 1 is block diagram illustrating an example environment in which several aspects of the present invention can be implemented. Computing system 100 there is shown containing client systems 110A-110C, internet 120, application servers 130A-130D, intranet 160, and data stores 180A-180D.

Merely for illustration, only representative number/type of systems is shown in FIG. 1. Many environments often contain many more systems, both in number and type, depending on the purpose for which the environment is designed. Each system/device of FIG. 1 is described below in further detail.

Intranet 160 represents a network providing connectivity between applications servers 130A-130D, and data stores 180A-180H, all provided within an enterprise (as indicated by the dotted boundary). Internet 120 extends the connectivity of these (and other systems of the enterprise) with external systems such as client systems 110A-110C. Each of intranet 160 and internet 120 may be implemented using protocols such as Transmission Control Protocol (TCP) and/or Internet Protocol (IP), well known in the relevant arts.

In general, in TCP/IP environments, an IP packet is used as a basic unit of transport, with the source address being set to the IP address assigned to the source system from which the packet originates and the destination address set to the IP address of the target system to which the packet is to be eventually delivered. An IP packet is said to be directed to a target system when the destination IP address of the packet is set to the IP address of the target system, such that the packet is eventually delivered to the target system by intranet 160 and internet 120.

Each of clients systems 110A-110C represents a system such as a personal computer, workstation, mobile device (e.g., cell phone), etc., used by users to generate transaction requests (e.g., in the form of SQL queries) to user applications executing in application servers 130A-130D. The requests may be generated using appropriate user interfaces. In general, a client system sends transaction requests for performing specific tasks to enterprise applications and receives as corresponding responses the results of performance of the requested tasks. Each request is sent in the form of an IP packet directed to the desired application server, with the IP packet including data identifying the requested task in the payload portion. Each transaction request may, in turn, generate/require one or more write (or/and) read requests, to be processed (as corresponding write or read operations) by the corresponding one of application servers 130A-130D.

Each of data stores 180A-180D represents a non-volatile (persistent) storage facilitating storage and retrieval of a collection of data by user applications executing in application servers 130A-130D. Each of data stores 180A-180B is assumed to be implemented as a corresponding database server using relational database technologies and accordingly providing storage and retrieval of data using structured queries such as SQL (Structured Query Language). Data store 180C is assumed to be implemented as a corresponding file server providing storage and retrieval of data in the form of files organized as one or more directories, as is well known in the relevant arts. Data store 180D is assumed to be implemented in the form of a FTP server.

Each of application servers 130A-130D represents a server, such as a web/application server, executing user applications capable of processing transaction requests received from users using client systems 110A-110C. Servers 130A-130D are together implemented in the form of a server cluster, implying some level of additional coordination/communication such that the entire group provides the view of a single server for the purpose of processing transactions received from different client systems. Though not shown, additional systems such as load balancers may be used in combination with the servers, to implement such a cluster. Once a transaction is processed, the processing server system sends the result of performance of the tasks to the requesting client system (one of 110A-110C).

Each application server may be designed to store the data corresponding to each (write) operation (or request) in one of the data stores such that other application servers can read/retrieve such stored data in processing corresponding (read) operations. The data portion corresponding to each operation (write or read) can represent large objects (e.g., of the magnitude of several mega-bytes), and it may be desirable that the corresponding operations be processed efficiently, at least to provide high throughput performance in processing of the operations.

The manner in which such operations can be processed according to several aspects of the present invention is described below with examples.

3. Efficient Processing of Write and Read Requests

FIGS. 2A and 2B are respective flow charts illustrating the manner in which write and read requests are processed in an embodiment. The flowcharts are described with respect to FIG. 1 merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart of FIG. 2A begins in step 201, in which control immediately passes to step 205.

In step 205, application server 130A receives transactions requiring storing of respective payloads. Each transaction may be received in the form of one or more IP packets, but as a stream of data over TCP. Each payload may be referred to as an object stream in Object Oriented Programming environments.

In step 210, application server 130A forms payloads and corresponding unique identifiers as a part of write requests for respective transactions. Each formed identifier is deemed to uniquely identify the corresponding payload in the entire cluster. Such identifier may be generated using various GUID (globally unique identifier) approaches, well known in the relevant arts.

In step 220, application server 130A stores the payload and associated identifier in a local cache. A local cache implies that the data is stored on hardware provided locally within application server 130A. In an embodiment, the local cache is implemented in the form of a file system supported by a local disk (secondary non-volatile storage). Such hardware normally provides substantially faster access than any of data stores 180A-180D to other entities (e.g., the other blocks shown in FIG. 3) in application server 130A. Many payloads and associated identifiers may be stored in the local cache. Upon storing of each payload and completing any other processing required by the transaction, the corresponding response may be sent (in step 225) to the client system from which the transaction is received.

In step 230, application server 130A propagates the payloads and associated identifiers (from the local cache) to respective target data stores. Such propagation may be performed at any later convenient time (for example, when transaction load is low, i.e., the processing/memory resources are under-utilized otherwise).

By using a local cache, the throughput performance of user applications may be enhanced for various reasons. For example, the propagation to the data stores may be postponed to a later duration, thereby conserving the resources (memory and processing) for usage with other transactions in the interim duration. In addition, the payloads available in the cache, may be served using the copies in the cache, which may provide for faster access to the payload (due to local access only), as described below. The flow chart of FIG. 2A ends in step 231.

With respect to FIG. 2B, the flowchart begins in step 239, in which control passes to step 240. In step 240, application server 130A receives a transaction requiring retrieval of a first payload, i.e., requiring retrieval of the data content of the first payload. In response, application server 130A checks whether the first payload is present in the local cache (step 250). Control passes to step 255 if a copy is present in the local cache, and to step 260 otherwise. In step 255, application server 130A retrieves the first payload from the local cache.

In step 260, application server 130A signals other servers in the cluster to propagate the first payload to the corresponding target. It should be appreciated that such signaling may be required since flowcharts of FIGS. 2A and 2B may operate in parallel and independently (e.g., as separate threads or processes), and there may be a time lag in completing propagation of the payloads stored in local caches. By signaling the other servers of the cluster, the requested payload may be propagated with a higher priority, compared to other payloads, awaiting propagation at the respective servers.

In step 270, application server 130A polls the corresponding data store for the first payload. The specific data store may be identified based on any convention, as will be apparent to one skilled in the relevant arts, at least by reading the disclosure provided herein. While step 270 is described as following step 260, in an alternative embodiment, the signaling of step 260 can be performed after step 270 only if the first poll (or other information) indicates that the payload is unavailable in the corresponding data store.

In step 280, application server 130A processes the transaction using the retrieved first payload. Thus, the first payload is processed per the requirements of the transaction, and the result is communicated back to the client system from which the transaction is received. Control then passes to step 299. It should be appreciated that the flowchart of FIG. 2B is performed several times to process corresponding transactions. The read requests can be processed in parallel with the processing of write requests of FIG. 2A. An example embodiment implementing the above noted features, is described in further detail below.

4. Application Server

Figure 3A:
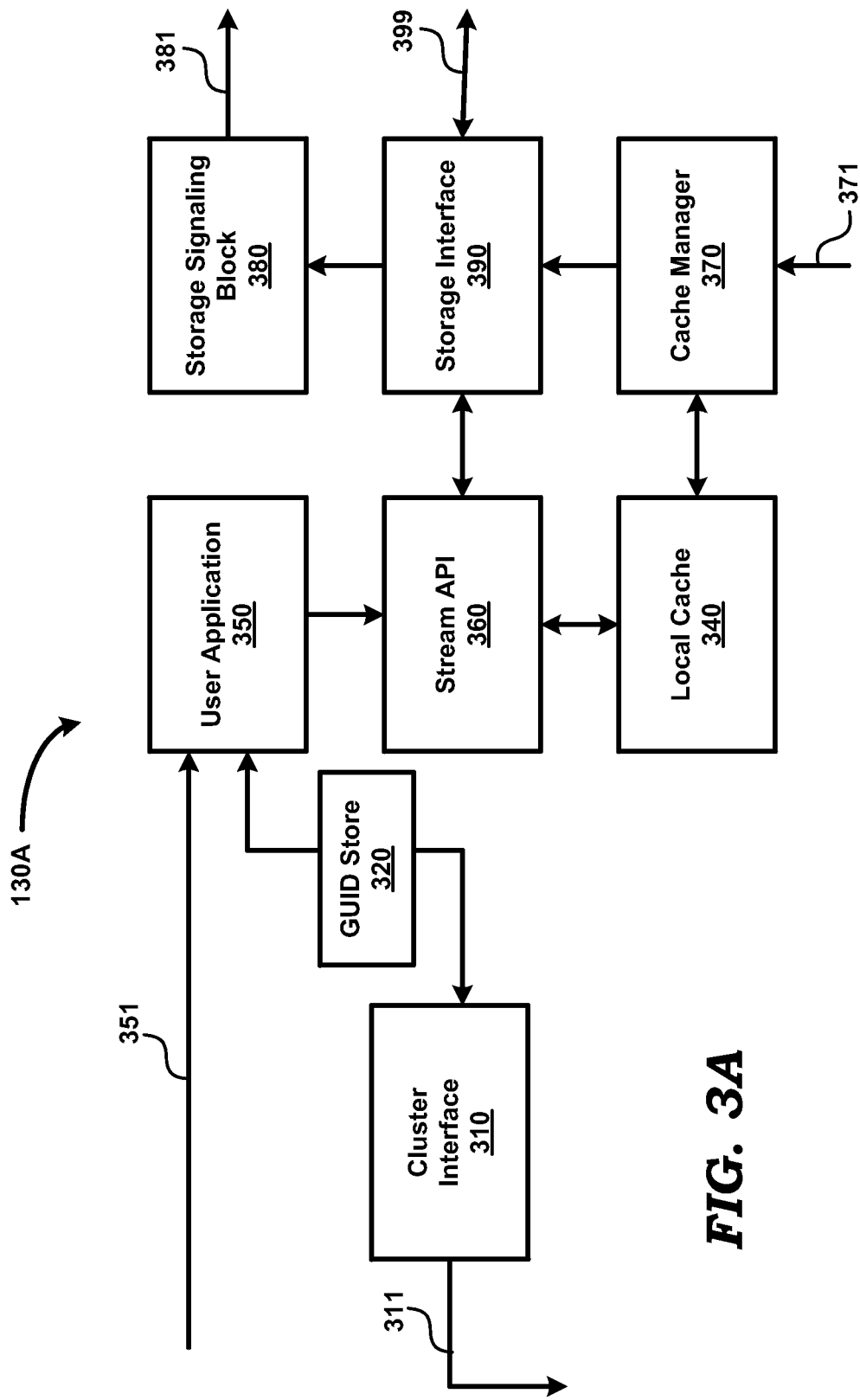
FIG. 3A is a block diagram illustrating the details of an application server in an embodiment.

FIG. 3 is a block diagram illustrating the details of application server 130A in one embodiment. Application server 130A is shown containing cluster interface 310, GUID store 320, local cache 340, user application 350, stream API 360, cache manager 370, storage signaling block 380 and storage interface 390. Application server 130A is shown containing several signal paths, with signal path 351 being connected to Internet 120, and signal paths 311, 371, 381 and 399 being connected to intranet 160. Each of the blocks can be implemented using a hardware elements supported by appropriate software components.

GUID store 310 stores the unique identifiers for each of the payloads, which are part of the write transactions processed by application server 130A. A globally unique identifier (GUID) may be generated using any of several well-known techniques, for example, GUID generators available at weblogic.wsee.util.Guid, 'oracle.soa.common, util.guid. GUIDGenerator, or oracle.tip.b2b.utility.Guid provided by Oracle Corporation. In embodiments described below, the unique identifier noted in step 220 may be formed by adding another portion (e.g., 3 bits) indicating the specific data store in which the payload is to be stored. Thus, the unique identifier contains the storage identifier and the received GUID. As described below, such convention for unique identifier simplifies the propagation of the payloads to respective data stores. In an embodiment, the additional portion is prefixed to the GUID. The data store identifier portion (the 3-bit prefix) may be specified by the customer, or be based on an algorithm. For example, the specific data store (180A-180D) in which a payload is to be stored may determine the value of the (additional portion (data-store identifier portion).

Cluster interface 310 communicates with other application servers of the same cluster (of which application server 130A is a part of) for exchanging and coordination of various types of information, for operation as a cluster. In an embodiment, the cluster interfaces of the application servers operate to together maintain a global table depicted in FIG. 3B, which contains a respective row 331-333 corresponding to each of the stored payloads. Though not shown, cluster interface 310 may examine local cache 340 and/or interface with storage interface 390 for the status of various payloads. The global table thus maintained is accessible in each of the application servers.

The 'Payload ID' represents the unique identifier indicating the data store (e.g., S2 in row 332) and the QUID (e.g., M3). The 'Processed State' indicates true if the processing of corresponding write operation is complete (into local cache 340). The time stamps for creation and last accessed are shown in corresponding columns. The 'stored by' column indicates the specific application server (130A-130D) that caused the payload to be stored. The 'Last Accessed by' column indicates the server that performed the read transaction for the payload. Using the clustering techniques, the payload identifier and other information of such a table are made available to other application servers.

Local cache 340 is implemented as a non-volatile storage. In an embodiment, local cache 340 is implemented using a file system supported on a local hard disk, such that each payload is stored in the form of a corresponding file. According to a convention, each file is stored with a name of <DataStore><GUID>.payload.p, in accordance with the convention of unique identifiers, noted above. Once the payload of a file is propagated to the data store specified in the identifier, the p suffix may be removed from the file name to indicate completion of propagation. The files, with or without p suffix, is available for serving the subsequent read operations for the same payload. Such files without p suffix may thereafter also continue to be available for read operations of user applications within the same server system.

User application 350 processes various transactions (requiring formation of read and write requests) received on path 351 from Internet 120, and sends the corresponding responses. Merely for simplicity, one user application is shown, though application server 130A can execute several user applications (each possibly processing corresponding types of transactions) in parallel. In an embodiment, user application 350 represents an order processing application and write requests may be formed when processing a purchase order, and read requests may be formed when processing a corresponding invoice. The data stored in the data stores supports processing of various orders.

With respect to processing of write operations/requests, each corresponding received transaction contains a corresponding payload. User application may merely request stream API 360 to process the write operation, for example, using a call 'storePayload (InputStream, DataStore)', wherein inputStream represents the payload to be written and DataStore represents the data store in which the payload is to be stored. The data store can be determined based on administrator configurations or various transient variables such as load on the data store, the response time required, etc. The call returns the unique identifier assigned to the stored pay load.

With respect to processing of read operations, user application 350 determines the unique identifier of the payload that is required to be retrieved. In case of payload written earlier by the same application server, GUID store 320 provides the unique identifier. In case of payload being written by some other application server (e.g., 130C), the table of FIG. 3B (maintained together by the cluster) can be used to determine the unique identifier. Alternatively, the identifiers are stored in the corresponding data store 180A-180D, and the data stored there can be examined to determine the unique identifier. The determination can be performed in a known way, using such and other required information.

The read operation may then be performed by invoking appropriate call (e.g., getPayload (UniqueIdentifier) in stream API 360. Once the payload is available, user application 350 processes the transaction and sends a response to the client from which the corresponding transaction originates.

Stream API 360 provides various utilities (in the form of corresponding method or procedure calls) that can be invoked by user application 350. With respect to invocation of a corresponding procedure for a write operation, stream API 360 determines the specific one of the data stores 180A-180D in which to store the payload based on the parameters of the invoked call. Stream API 360 then forms a GUID and constructs the unique user identifier using the identifier of the determined data store and the GUID, as described above. Stream API thereafter stores the payload with a file name formed as <DataStore><GUID>.payload.p, as noted above.

In one embodiment, stream API 360 stores only large objects (payloads exceeding a pre-specified size, e.g., 10 Megabits) in local cache 340, for later propagation by cache manager 370, while interfacing with storage interface 390 to store the smaller objects (while bypassing local cache 340). Due to such an operation, the smaller objects are available immediately via the respective data store for other application servers 130B-130D (including for determining the unique identifiers of payloads), while the performance throughput of application server 130A is not impeded by the overhead associated with storing of large data items in corresponding data stores (as well as serving read operation requiring access to the cached items). In an alternative embodiment, stream API 360 stores all the objects (small and large) in local cache 340 for later propagation by cache manager 370 to respective data stores. In such a case, even the small objects are available for later serving of the read requests, and thus efficiency may be enhanced for processing more read requests.

With respect to read requests, stream API 360 first examines local cache 340 to check whether the corresponding file is present (step 250 of FIG. 2). If the data is determined to be present in local cache 340, the corresponding data is retrieved (from local cache 340) and forwarded to user application 150. Otherwise, storage interface 390 interfaces with storage signaling block 380 to perform step 280 and then polls the data store (specified in the identifier) for the payload. In an embodiment, the data storage is polled for a fixed number of times before reporting a failure (if the payload is not present in that data store by that time). The retrieved payload may be stored in local cache 340 for serving future read requests.

Storage signaling block 380 operates to signal the cache managers of the remaining application servers of the cluster to propagate the payload corresponding to the read transaction, on a priority basis. In an embodiment, Java Message Service (JMS) topic is created and a message is posted on the corresponding queue to signal the cache managers of the other application servers. Alternatively, only the specific application server (e.g., 130B) indicated to be storing (e.g., AS2 in row 332) in FIG. 3B may be signaled.

Cache manager 370 propagates the payloads from local cache 340 to respective data stores by interfacing with storage interface 390. Such propagation may be performed when the transaction load is low (e.g., idle time) in application server 130A. However, when a signal to propagate a specific payload is received from block 380 of another application server 130B, the payload is propagated to the corresponding data store on a priority basis (i.e., ahead of earlier stored payloads in local cache 340 and as soon as possible without waiting for low transaction load).

The manner of propagation depends on the implementation of data store 180A-180D. In case the data store is implemented as a relational database, propagation entails a SQL query to add the payload and the corresponding unique identifier in a row of a corresponding table provided in the data store. In case the data store is operated as a file store, the file of local cache 340 (with name having same convention as above) is transferred to the file/data store.

Once the payload is propagated to the corresponding data store, cache manager 370 may further remove the entries in local cache 340 based on policies such as LRU (least recently used). In other words, if a payload is not accessed/retrieved for a certain duration, the corresponding storage space in local cache 340 may be freed by removing that payload from local cache 340.

In an embodiment, the combination of storage interface and cache manager 370 is implemented in the form of software threads that execute continuously. One thread is designed to copy the payload from local cache 340 to the corresponding one of data Store 180A-180D. A second thread is designed to delete payloads from cache, based on policies such as, for example, an LRU (least recently used) algorithm or customer-defined policy (for e.g., remove any payload older than 2 weeks).

The operation of some of the above described features is illustrated below with some examples.

5. Example Illustrations

Figure 4:
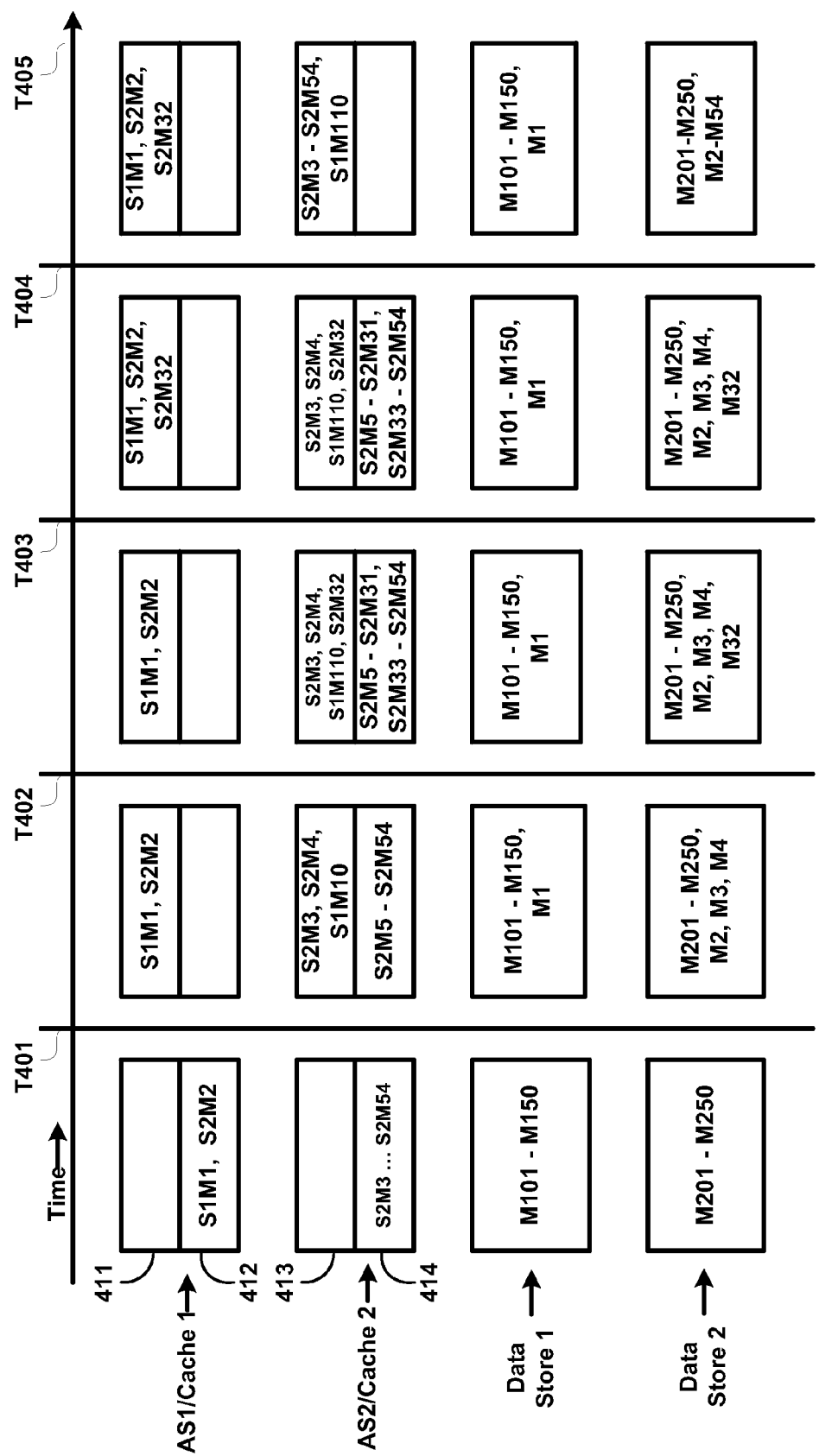
FIG. 4 depicts an example state diagram illustrating the manner in which read and write requests are processed in an embodiment.

FIG. 4 depicts a state diagram illustrating the manner in which read and write requests are processed in an embodiment. For ease of illustration, the example is described with only two application servers (AS1 and AS2, with corresponding caches cache 1 and cache 2 respectively, and two data stores (data store 1 and data store 2, which may correspond to any two of data stores 180A-180D of FIG. 1).

Areas 411 and 412 respectively represent read cache and write cache areas of cache 1, while areas 413 and 414 respectively represent read cache and write cache areas of cache 2. A write cache area contains payloads awaiting propagation to corresponding data stores. The payloads in the write cache area are also available for serving read requests. A read cache contains the payloads cached for serving any subsequent read requests. For ease of understanding, the payloads (data) in either of caches 1 and 2 are represented by prefixing the identifier of the data store (S1 for data store 1, and S2 for data store 2). The prefixes are dropped when referring to payloads stored in data stores 1 or 2.

Prior to an arbitrary time instance T401, area 412 of cache 1 is shown with contents S1M1 and S2M2 in the write area, due to the processing of respective write transactions. Area 414 of cache 2 is shown containing payloads S2M3 through S2M54. Data store 1 is shown containing payloads M101 through M150, and data store 2 is shown containing payloads M201 through M250.

In time interval T401 to T402, payloads S1M1, S2M2, S2M3 and S2M4 are shown as having been propagated (S1M1 as M1 in data store 1, S2M2 as M2 in data store 2, etc, according to the convention noted above) to the corresponding ones of data stores 1 and 2. In addition, S1M1 and S2M2 are shown in the read cache area of cache 1, indicating that these payloads are available in the cache for serving read operations (after having been propagated to the respective data stores). Similarly, S2M3 and S2M4 are shown as cached in the read cache area of cache 2, in addition to being propagated to data store 2. Further, S1M110 is shown stored in the read area of cache 2, in response to processing of an earlier read operation for payload S1M10.

In time interval T402 to T403, and corresponding to step 240, it is assumed that application server AS1 receives a read transaction requiring M32, awaiting propagation in cache 2 (another application server). M32 is not available in cache 1, and application server AS1 signals other servers of the cluster (including AS2) to cause M32 to request propagation to data store 2 at a higher priority. AS2 propagates M32 (or S2M32) to data store 2, as shown.

In time interval T403 to T404, AS1 is shown as having retrieved (and copied to cache 1) M32 from data store 2.

S2M5-S2M31 and S2M33-S2M54 continue to remain in the read area of cache 2. In time interval T404 to T405, S2M5-S2M31 and S2M33-S2M54 are shown as having been propagated to data store 2 by AS2, for example, when the resources are not required for processing transactions. The items may be propagated in the same sequence (in the absence of signaling from storage signaling block 380) in which they are received into local cache, at least with respect to payloads destined for the same data store.

It should be understood that the table of FIG. 3B is formed to include a row corresponding to each of items 11-154, and the data in the corresponding columns is updated as the corresponding payload is written/retrieved.

It should be appreciated that the features described above can be implemented in various embodiments as a desired combination of one or more of hardware, executable modules, and firmware. The description is continued with respect to an embodiment in which various features are operative when executable modules are executed.

6. Digital Processing System

Figure 5:
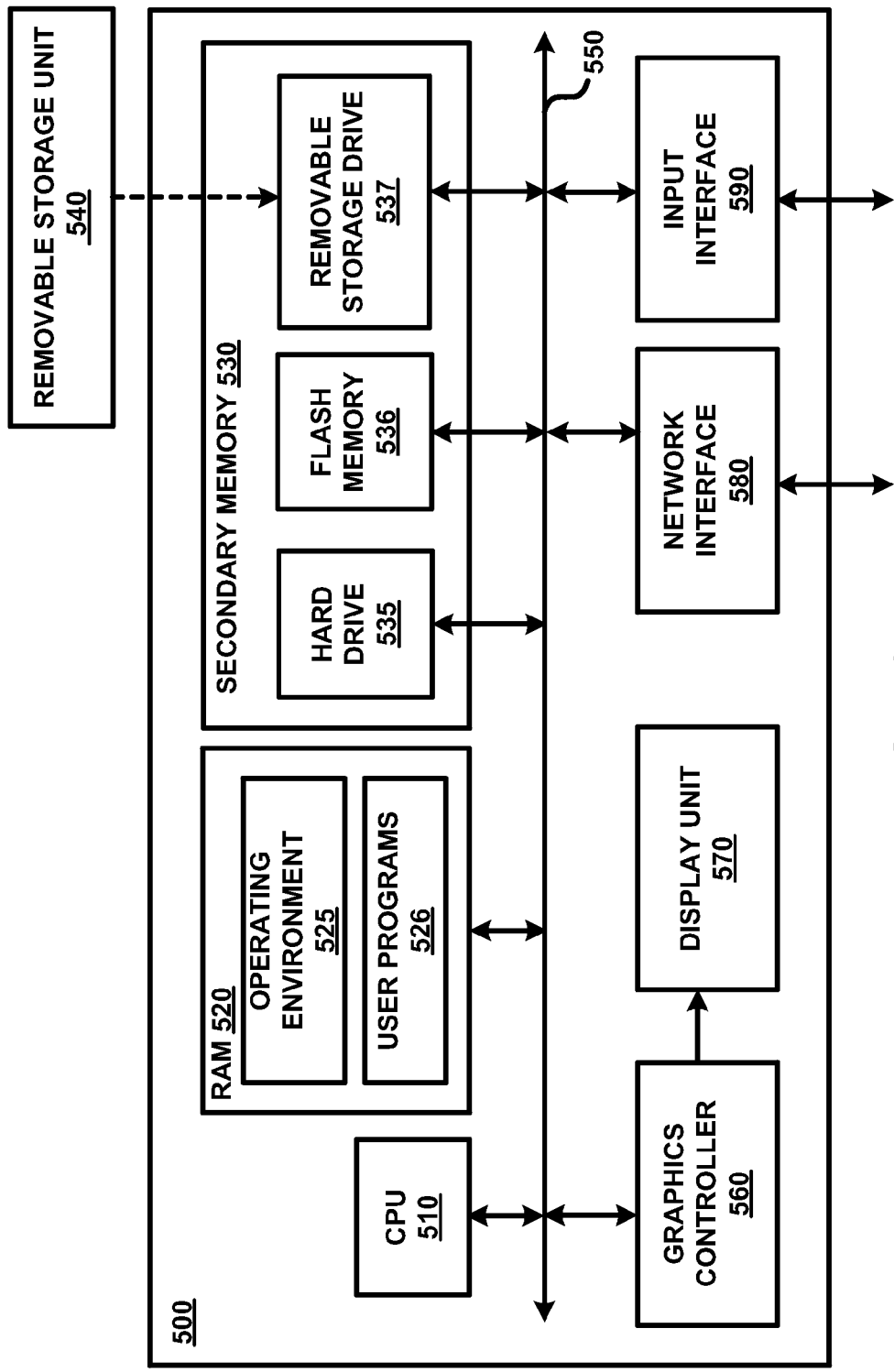
FIG. 5 is a block diagram illustrating the details of a digital processing system in which several aspects of the present invention are operative by execution of appropriate executable modules.

FIG. 5 is a block diagram illustrating the details of digital processing system 500 in which various aspects of the present invention are operative by execution of appropriate executable modules. Digital processing system 500 may correspond to any of application servers 130A-130D of FIG. 1.

Digital processing system 500 may contain one or more processors such as a central processing unit (CPU) 510, random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present invention. CPU 510 may contain multiple processing units, with each processing unit potentially being designed for a specific task. Alternatively, CPU 510 may contain only a single general-purpose processing unit.

RAM 520 may receive instructions from secondary memory 530 using communication path 550. RAM 520 is shown currently containing software instructions constituting operating environment 525 and/or other user programs 526. User programs 526 may include user application 350 of FIG. 3. In addition to operating environment 525, RAM 520 may contain other software programs such as device drivers, virtual machines, etc., which provide a (common) run time environment for execution of other/user programs.

Graphics controller 560 generates display signals (e.g., in RGB format) to display unit 570 based on data/instructions received from CPU 510. Display unit 570 contains a display screen to display the images defined by the display signals. Input interface 590 may correspond to a keyboard and a pointing device (e.g., touch-pad, mouse) and may be used to provide inputs to system 500. Network interface 580 provides connectivity to one or more networks (e.g., using Internet Protocol), and may be used to communicate with other systems connected to the network. Network interface 580 is deemed to include interfaces to internet 120 and intranet 160 of FIG. 1.

Secondary memory 530 may contain hard drive 535, flash memory 536, and removable storage drive 537. Secondary memory 530 may store the data (for example, the payloads and the corresponding identifiers referred to above in local cache, and made accessible in the form of a file system) and software instructions (which when executed by CPU 510, perform the steps of FIGS. 2A and 2B, and which enable digital processing system 500 to provide several features in accordance with the present invention). Secondary memory 530 may include the persistent storage for supporting local cache 340, and GUID store 320 of FIG. 3.

Some or all of the data and instructions may be provided on removable storage unit 540, and the data and instructions may be read and provided by removable storage drive 537 to CPU 510. Floppy drive, magnetic tape drive, CD-ROM drive, DVD Drive, Flash memory, removable memory chip (PCMCIA Card, EPROM) are examples of such removable storage drive 537.

Removable storage unit 540 may be implemented using medium and storage format compatible with removable storage drive 537 such that removable storage drive 537 can read the data and instructions. Thus, removable storage unit 540 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 540 or hard disk installed in hard drive 535. These computer program products are means for providing software to digital processing system 500. CPU 510 may retrieve the software instructions, and execute the instructions to provide various features of the present invention described above.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

7. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method implemented in a first application server of a plurality of application servers contained in a server cluster, said method comprising:
forming a write request containing a payload and a unique identifier for said payload, wherein said payload is received from a client system in a first transaction requiring a write operation, wherein said unique identifier comprises a portion indicating the corresponding data store in which the associated payload is to be stored;
storing said payload associated with said unique identifier in a local cache;
making available said unique identifier to user applications executing in those of said plurality of application servers of said server cluster, other than said first application server, for processing read transactions related to said payload;
propagating said payload and said unique identifier to a first data store, wherein said propagating uses value of said portion to confirm the data store in which to store said payload;
receiving a first read request for a first payload, wherein said read request is in response to receiving a second transaction requiring processing of said first payload;
checking whether said first payload is present in said local cache;
if said first payload is present in said local cache, sending said first payload as a response to said read request based on said first payload in said local cache; and
if said first payload is not present in said local cache:
confirming a second data store at which said first payload is expected to be present; and
retrieving said first payload from said second data store,
wherein those of said plurality of application servers of said server cluster, other than said first application server, are designed to retrieve said payload only from said first data store, and not from said local cache of said first application server.

2. The method of claim 1, said retrieving further comprising:
signaling those of said plurality of application servers of said server cluster other than said first application server, to propagate said first payload; and
polling said second data store for said first payload until said first payload is available in said second data store.

3. The method of claim 2, further comprising:
ascertaining whether said first payload is present at said second data store,
wherein said signaling is performed only if said ascertaining indicates that said first payload is not yet present at said second data store.

4. The method of claim 2, wherein said signaling is performed if said checking indicates that said first payload is not present in said local cache, irrespective of whether or not said first payload is already present in said second data store at the time of said signaling.

5. The method of claim 2, wherein said local cache is implemented in the form of a file system supported on a non-volatile memory, wherein said first file system is designed to store each payload as a corresponding file.

6. The method of claim 1, further comprising:
maintaining a sequence of not-yet-propagated payloads stored in said local cache, but awaiting propagation to corresponding data stores;
receiving a signaling request for propagating a second payload in said sequence; and
in response to said signaling request, performing said propagating of said second payload to corresponding data store, ahead of other non-yet-propagated payloads earlier in said sequence,
wherein said not-yet-propagated payloads are propagated in the same sequence to respective data stores unless said signaling request is received for out-of-sequence propagation.

7. A non-transitory machine readable medium storing one or more sequences of instructions for execution by one or more processors in a first application server of a plurality of application servers contained in a server cluster, wherein execution of said one or more sequences of instructions by said one or more processors causes said application server to perform the actions of:
forming a write request containing a payload and a unique identifier for said payload, wherein said payload is received from a client system in a first transaction requiring a write operation, wherein said unique identifier comprises a portion indicating the corresponding data store in which the associated payload is to be stored;
storing said payload associated with said unique identifier in a local cache;
making available said unique identifier to user applications executing in those of said plurality of application servers of said server cluster, other than said first application server, for processing read transactions related to said payload;
propagating said payload and said unique identifier to a first data store, wherein said propagating uses value of said portion to confirm the data store in which to store said payload;
receiving a first read request for a first payload, wherein said read request is in response to receiving a second transaction requiring processing of said first payload;
checking whether said first payload is present in said local cache;
if said first payload is present in said local cache, sending said first payload as a response to said read request based on said first payload in said local cache; and
if said first payload is not present in said local cache:
confirming a second data store at which said first payload is expected to be present; and
retrieving said first payload from said second data store,
wherein those of said plurality of application servers of said server cluster, other than said first application server, are designed to retrieve said payload only from said first data store, and not from said local cache of said first application server.

8. The non-transitory machine readable medium of claim 7, said retrieving further comprising:
signaling those of said plurality of application servers of said server cluster other than said first application server, to propagate said first payload; and
polling said second data store for said first payload until said first payload is available in said second data store.

9. The non-transitory machine readable medium of claim 8, further comprising:
ascertaining whether said first payload is present at said second data store,
wherein said signaling is performed only if said ascertaining indicates that said first payload is not yet present at said second data store.

10. The non-transitory machine readable medium of claim 8, wherein said signaling is performed if said checking indicates that said first payload is not present in said local cache, irrespective of whether or not said first payload is already present in said second data store at the time of said signaling.

11. The non-transitory machine readable medium of claim 8, wherein said local cache is implemented in the form of a file system supported on a non-volatile memory, wherein said first file system is designed to store each payload as a corresponding file.

12. The non-transitory machine readable medium of claim 7, further comprising:
   maintaining a sequence of not-yet-propagated payloads stored in said local cache, but awaiting propagation to corresponding data stores;
   receiving a signaling request for propagating a second payload in said sequence; and
   in response to said signaling request, performing said propagating of said second payload to corresponding data store, ahead of other non-yet-propagated payloads earlier in said sequence,
   wherein said not-yet-propagated payloads are propagated in the same sequence to respective data stores unless said signaling request is received for out-of-sequence propagation.

13. A computing system to serve requests received from client systems, said computing system comprising:
   a plurality of data stores; and
   a plurality of application servers operating as a server cluster, wherein a first application server of said plurality of application servers comprises at least one processor and a memory, wherein said at least one processor retrieves instructions from said memory and executes the retrieved instructions, wherein execution of the retrieved instructions causes said first application server to perform the actions of:
      forming a write request containing a payload and a unique identifier for said payload, wherein said payload is received from a client system in a first transaction requiring a write operation;
      storing said payload associated with said unique identifier in a local cache, payloads being stored in said local cache for propagation to corresponding data stores;
      maintaining a sequence of not-yet-propagated payloads stored in said local cache, but awaiting propagation to corresponding data stores, said sequence containing said payload;
      receiving a signaling request for propagating said payload maintained in said sequence;
      in response to said signaling request, propagating said payload and said unique identifier to a first data store of said plurality of data stores, wherein said payload is propagated ahead of other non-yet-propagated payloads earlier in said sequence,
      wherein said not-yet-propagated payloads are propagated in the same sequence to respective data stores unless said signaling request is received for out-of-sequence propagation;
      receiving a first read request for a first payload, wherein said read request is in response to receiving a second transaction requiring processing of said first payload;
      checking whether said first payload is present in said local cache; and
      if said first payload is present in said local cache, sending said first payload as a response to said read request based on said first payload in said local cache,
      wherein those of said plurality of application servers of said server cluster, other than said first application server, are designed to retrieve said payload only from said first data store, and not from said local cache of said first application server.

14. The computing system of claim 13, if said first payload is not present in said local cache, the actions further comprising:
   confirming a second data store at which said first payload is expected to be present;
   signaling other servers of said server cluster to propagate said first payload; and
   polling said second data store for said first payload until said first payload is retrieved from said second data store.

15. The computing system of claim 13, the actions further comprising:
   ascertaining whether said first payload is present at said second data store,
   wherein said signaling is performed only if said ascertaining indicates that said first payload is not yet present at said second data store.

16. The computing system of claim 13, wherein said signaling is performed if said checking indicates that said first payload is not present in said local cache, irrespective of whether or not said first payload is already present in said second data store at the time of said signaling.

17. The computing system of claim 13, wherein said local cache is implemented in the form of a file system supported on a non-volatile memory, wherein said first file system is designed to store each payload as a corresponding file.

18. A computing system to serve requests received from client systems, said computing system comprising:
   a plurality of data stores; and
   a plurality of application servers operating as a server cluster, wherein a first application server of said plurality of application servers comprises at least one processor and a memory, wherein said at least one processor retrieves instructions from said memory and executes the retrieved instructions, wherein execution of the retrieved instructions causes said first application server to perform the actions of:
      forming a write request containing a payload and a unique identifier for said payload, wherein said payload is received from a client system in a first transaction requiring a write operation, wherein said unique identifier comprises a portion indicating the corresponding data store in which the associated payload is to be stored;
      storing said payload associated with said unique identifier in a local cache;
      making available said unique identifier to user applications executing in those of said plurality of application servers of said server cluster, other than said first application server, for processing read transactions related to said payload;
      propagating said payload and said unique identifier to a first data store of said plurality of data stores, wherein said propagating uses value of said portion to confirm the data store in which to store said payload;
      receiving a first read request for a first payload, wherein said read request is in response to receiving a second transaction requiring processing of said first payload;
      checking whether said first payload is present in said local cache;
      if said first payload is present in said local cache, sending said first payload as a response to said read request based on said first payload in said local cache; and
      if said first payload is not present in said local cache:

confirming a second data store of said plurality of data stores at which said first payload is expected to be present; and retrieving said first payload from said second data store, wherein those of said plurality of application servers of said server cluster, other than said first application server, are designed to retrieve said payload only from said first data store, and not from said local cache of said first application server.

19. The computing system of claim 18, said retrieving further comprising:

signaling those of said plurality of application servers of said server cluster other than said first application server, to propagate said first payload; and polling said second data store for said first payload until said first payload is available in said second data store.

20. The method of claim 18, further comprising:

maintaining a sequence of not-yet-propagated payloads stored in said local cache, but awaiting propagation to corresponding data stores;

receiving a signaling request for propagating a second payload in said sequence; and in response to said signaling request, performing said propagating of said second payload to corresponding data store, ahead of other non-yet-propagated payloads earlier in said sequence, wherein said not-yet-propagated payloads are propagated in the same sequence to respective data stores unless said signaling request is received for out-of-sequence propagation.

* * * * *